United States Patent
Shimura

(10) Patent No.: US 7,139,429 B2
(45) Date of Patent: Nov. 21, 2006

(54) IMAGE RECOGNITION SCHEME

(75) Inventor: Hiroshi Shimura, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 613 days.

(21) Appl. No.: 10/052,502

(22) Filed: Jan. 23, 2002

(65) Prior Publication Data

US 2002/0146174 A1    Oct. 10, 2002

(30) Foreign Application Priority Data

Jan. 25, 2001    (JP)    ............... 2001-017035

(51) Int. Cl.
  *G06K 9/00*    (2006.01)
  *G06K 9/68*    (2006.01)
(52) U.S. Cl. ............ 382/181; 382/209; 382/217; 382/218; 382/219
(58) Field of Classification Search ........ 382/209, 382/217, 218, 194, 181, 195
See application file for complete search history.

(56) References Cited

U.S. PATENT DOCUMENTS 5,008,946 A * 4/1991 Ando .................. 382/104
5,111,516 A   5/1992 Nakano et al.
6,178,262 B1  1/2001 Picard et al.
6,463,176 B1 * 10/2002 Matsugu et al. ........ 382/195

FOREIGN PATENT DOCUMENTS

| EP | 1 014 294 A2 | 6/2000 |
| EP | 1 018 700 A2 | 7/2000 |
| JP | 8-263662 | 10/1996 |

OTHER PUBLICATIONS

Thomas Zielke, et al., Cartrack: "Computer Vision-Based Car-Following" Applications of Computer Vissions Proceeding, 1992 IEEE.

* cited by examiner

*Primary Examiner*—Jingge Wu
*Assistant Examiner*—Brian Le
(74) *Attorney, Agent, or Firm*—Dickstein Shapiro LLP

(57) ABSTRACT

An image recognition method comprises the steps of: a) examining as to how much input image parts resemble a predetermined figure comprising a plurality of elements, and giving a first score on each image part as to how much it resembles to the element of the predetermined figure, and giving a second score on the image parts as to much a positional relationship therebetween resembles that of the elements of the predetermined figure; and b) determining as to whether or not the input image parts coincide the predetermined figure by using the first and second scores together.

12 Claims, 7 Drawing Sheets

FIG.3

|   |   |   |   | b | b | b | b |   |   |   |   |
|---|---|---|---|---|---|---|---|---|---|---|---|
|   |   |   | b | a | a | a | a | b |   |   |   |
|   |   | b | a | 2 | 3 | 3 | 4 | a | b |   |   |
|   | b | a | 2 | 2 | 3 | 3 | 4 | 4 | a | b |   |
| b | a | 2 | 2 | 2 | 3 | 3 | 4 | 4 | 4 | a | b |
| b | a | 1 | 1 | 1 | 9 | 9 | 5 | 5 | 5 | a | b |
| b | a | 1 | 1 | 1 | 9 | 9 | 5 | 5 | 5 | a | b |
| b | a | 8 | 8 | 8 | 7 | 7 | 6 | 6 | 6 | a | b |
|   | b | a | 8 | 8 | 7 | 7 | 6 | 6 | a | b |   |
|   |   | b | a | 8 | 7 | 7 | 6 | a | b |   |   |
|   |   |   | b | a | a | a | a | b |   |   |   |
|   |   |   |   | b | b | b | b |   |   |   |   |

(same grid as FIG.3 with shading)

IMAGE RECOGNITION SCHEME

BACKGROUND OF THE INVENTION

1. Field of the Invention

The present invention relates to an image recognition scheme, and, in particular, to an image recognition scheme by which a specific pattern image can be recognized/identified/detected highly precisely.

2. Description of the Related Art

Concerning a color image recognition method, for example, Japanese laid-open patent application No. 8-263662 discloses a method in which, not an entire input color image is processed uniformly, but only a sad. Patterns image which is formed in accordance with a predetermined rule is attempted to be recognized highly precisely.

According to this art, mark extraction is made by using a window for scanning 'binary image data' (in which each pixel has a value of either one of two values, for example, 0 and 1, or white and black) or through Hough transformation. However, determination as to whether or not a target image part corresponds to a predetermined mark (pattern image) to be recognized/detected may be difficult in case where a relevant image part has become unclear, i.e., a relevant figure is faint, or crushed due to some reason.

SUMMARY OF THE INVENTION

A present invention has been devised in order to solve such a problem, and, an object of the present invention is to provide a novel image recognition scheme by which image recognition/identification/detection can be made highly precisely even on such an unclear image.

According to the present invention, a relevant image part is given a score according to resemblance thereof with a predetermined pattern image, and, then, at a next stage, this score is reflected by a determination for pattern detection to be achieved.

For example, in case a pattern image including three marks is detected, if one mark thereof is faint by accident in an actual object predetermined image part, this image part may not be determined as the predetermined pattern image ever if it is originally the predetermined pattern image, in the related art. In contrast thereto, according to the present invention, even in such a case in which only one of three marks is faint or crashed, it may be extracted as a mark candidate having even a low resemblance, and, then, finally, the target image part may be correctly determined as the predetermined pattern image. Furthermore, according to the present invention, when every mark candidates are nothing but of low resemblance, the target image part is not determined as the predetermined pattern image. Thereby, it is possible to prevent an image part which is other than the relevant pattern image from being erroneously determined as the relevant pattern image. Thus, according to the present invention, as a target image pattern/figure is totally or symmetrically examined, the highly-precisely determination can be obtained.

An image recognition device according to the present invention includes an extracting part extracting, from binary image data, predetermined marks, and a determining part determining whether or not the thus-extracted marks form a predetermined pattern to be recognized/detected. Specifically, the extracting part includes a scoring part which cuts out a predetermined area from the input binary image, a counting part counts the number of black pixels and/or the number of black pixels determined after predetermined inter-pixel logical operation is performed, and a first scoring part which gives a score on resemblance with the predetermined mark, from the thus-counted number of black pixels and/or inter-pixel relationship. The determining part includes a pattern detecting part which detects a pattern from position information on the extracted marks, a second scoring part which gives a score on resemblance on the pattern based on the score of each mark obtained by the first scoring part, and a decision part which finally determines from the score obtained by the second scoring part, whether or not the thus-examined target pattern is the predetermined pattern to be recognized/detected.

Thus, according to the present invention, as input image parts can be given scores by various manner as to how much these image parts resemble to a predetermined figure (pattern) individually/independently, and, then, after that, a positional relationship therebetween is examined as to how much the positional relationship of the input image parts resembles the same of the elements of the predetermined figure to be recognized/detected, together with a sum of the resemblances of the respective marks, synthetically. Thereby, even when some image part may not be satisfactorily resemble to the element of the predetermined figure due to faint tone in printed image or crash of each element there due to aging of the printed image or the like, the predetermined figure can be recognized when the positional relationship therebetween is sufficiently resemble to that of the ideal one, and, also, the sum of the scores in resemblances on the respective image parts. Thus, it is possible to positively recognize the predetermined figure, and also, positively avoid erroneous recognition, by totally, synthetically and finely examining the input image parts.

BRIEF DESCRIPTION OF THE DRAWINGS

Other objects and further features of the present invention will become more apparent from the following detailed description when read in conjunction with the following accompanying drawings:

FIG. 3 shows an example of a mask according to the above-mentioned embodiment of the present invention to be used for measuring the number of black pixels on respective areas concerning a target pattern so as to give scores on each mark extracted;

FIG. 4 shows an example of an arrangement of actual black pixels on the mask shown in FIG. 3;

FIG. 5 shows an example of an arrangement of black pixels to be counted on the mask shown in FIG. 4 according to the present invention;

FIG. 6 shows another example of an arrangement of black pixels to be counted on the mask shown in FIG. 4 according to the present invention;

DESCRIPTION OF THE PREFERRED EMBODIMENTS

Figure 1:
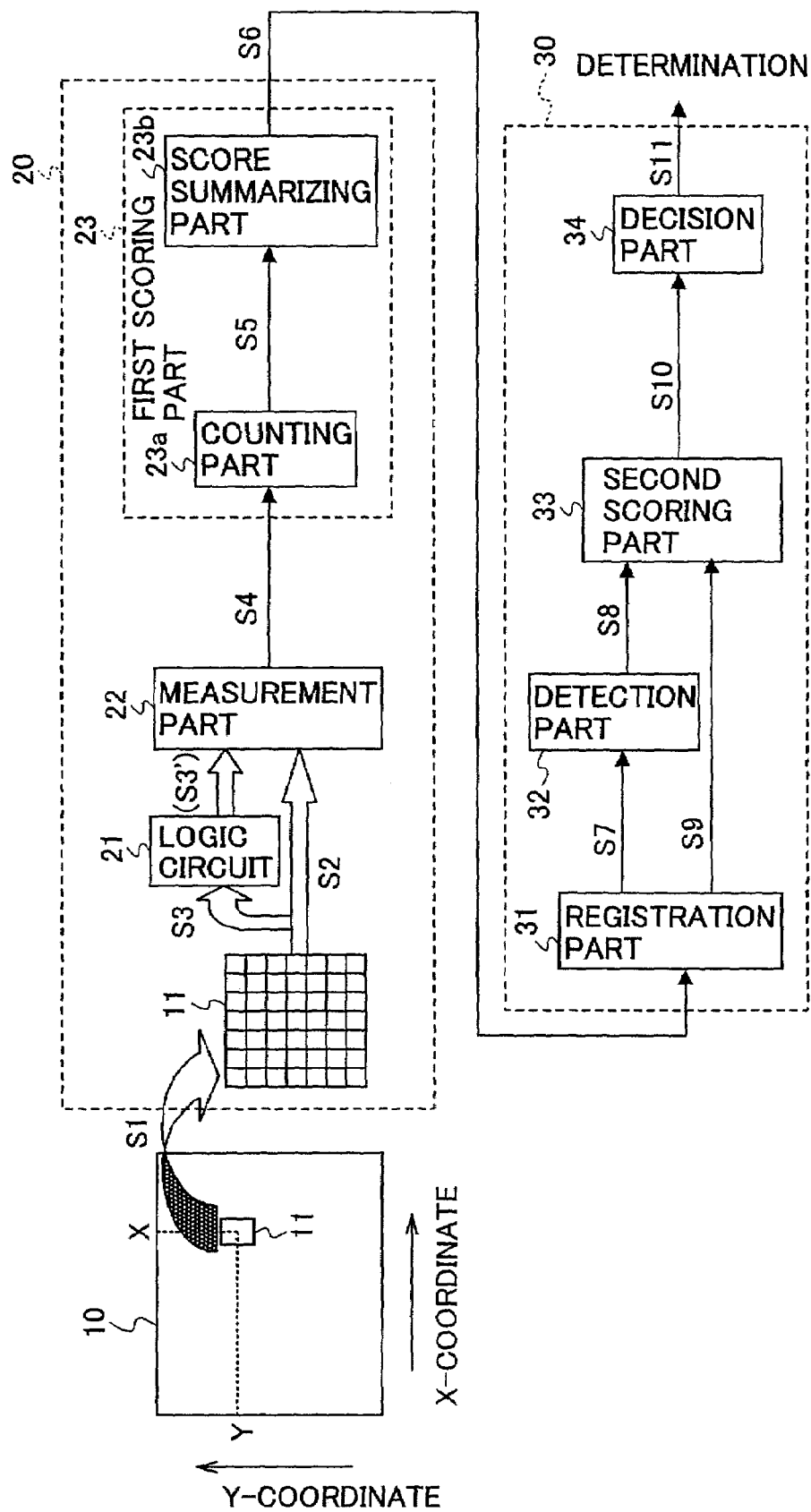
FIG. 1 illustrates a general configuration of one embodiment of the present invention and an operation flow thereof according to the present invention.

FIG. 1 illustrates an example of a flow of operation in the whole of an image recognition device in one embodiment of the present invention. As shown in the figure, the image recognition device includes an extracting part 20 including a logical circuit 21, a measurement part 22, and a first scoring part 23, while a determining part 30 which includes a registration part 31, a detection part 32, a second scoring part 33, and a decision part 34. The first scoring part 23 has a scoring part 23a and a score summarizing part 23b.

First, a predetermined area is extracted via a mask 11 from a binary image (binary image data) 10 (in a step S1), and measurement part 22 counts the number of black pixels in the predetermined area defined by the mask 11, or the number of black pixels after performance of logic operation between pixels using the logic circuit 21 (in steps S2 and S3). The scoring part 23a determines a score on the thus-processed area as a mark candidate from the counted number of black pixels (in a step S4) thereon, and the thus-counted scores on the respective mark candidates are totaled as a resemblance value by the score summarizing part 23b (in a step S5). The registration part 31 determines the thus-processed areas of the mark candidates as marks temporarily when the areas have the resemblance value more than a predetermined value (in a step S6), then, sends the coordinate values thereof to the detection part 32 (in a step S7), and, the resemblance value is sent to the second scoring part 33 (in a step S9).

The detection part 32 detects positional difference between the thus-detected pattern and the predetermined pattern to be recognized/detected, determines a score on the amount of the thus-detected positional difference, and sends it to the second scoring part 33 (in a step S8). The second scoring part 33 summarizes the thus-obtained score on the positional difference and the above-mentioned resemblance value on the total score of the marks detected, and determines a final resemblance value from these two factors in total, which is sent to the decision part 34 (in a step S10). Then, in the decision part 34, it is determined that the thus-examined pattern is of the predetermined pattern to be recognized/detected when the thus-obtained final resemblance value is not-less than a predetermined value (in a step S11).

It is noted that the above-mentioned mask 11 scans the entire binary image 10 in sequence, and at every time the mark is located at a position in the binary image, the above-described processing is performed on the pixels defined by the mask at the time.

Figure 2:
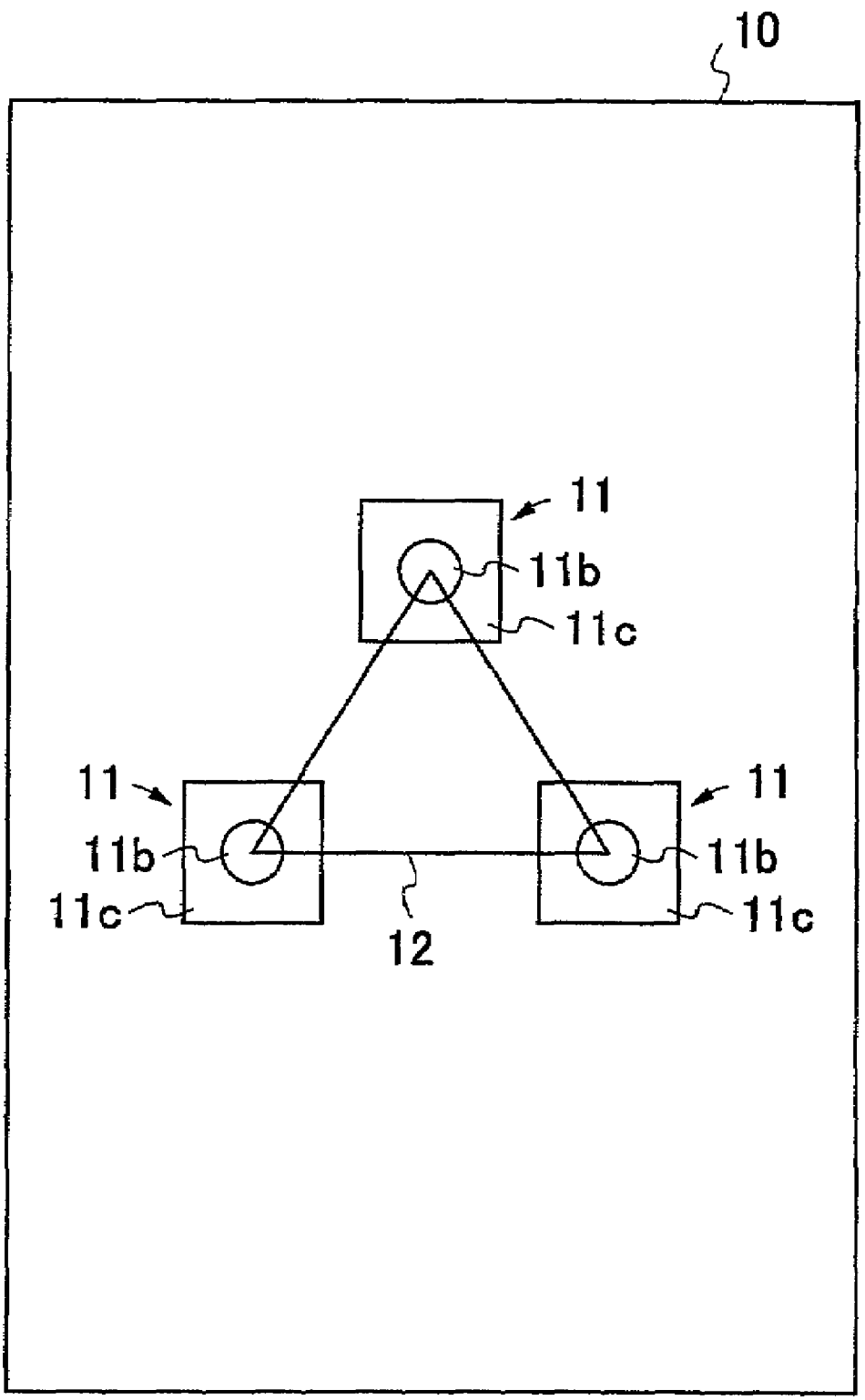
FIG. 2 shows an example of a pattern which consists of marks to be recognized/detected by the present invention.

FIG. 2 shows an example of a predetermined pattern which includes three marks (at vertexes of a triangle shown) to be recognized/detected. The mask 11 which defines areas from the binary image 10 includes a foreground part (mark) 11b including pixels forming each mark, and a background part 11c including pixels acting as a background of the mark. A pattern 12 is formed by these three marks. In this example, as shown in the figure, the pattern is of the triangle, and the respective marks act as the vertexes of the triangle as mentioned above. As will now be described, the plurality of marks are given scores (resemblance with the ideal mark), and then, whether the pattern 12 formed by these marks on the target binary image examined is of the predetermined pattern to be recognized/detected is determined by the determination part 30.

A specific-example will now be described. In this example, each mark is of a circle having a diameter of 8 pixels.

FIG. 3 shows an example of the mask 11 in the embodiment of the present invention, and, in the mask 11, a target pixel 11a is one located at the center thereof, as shown in the figure. The foreground part 11b is divided into a plurality of areas, i.e., a first area through a ninth area, and reference numerals indicating the number of relevant areas are given to the respective pixels, as shown in the figure. The background part 11c includes two areas, i.e., an 'a' area and a 'b' area, the same alphabets of 'a' and 'b' indicating the relevant areas are given to the respective pixels, as shown in the figure.

The mask 11 is made to move on a relevant binary image 10, so as to scan the image 10 in a manner in which the target pixel 11a coincides with each of all the pixels of the relevant image 10 sequentially, pixel by pixel, for example. In each position of the mask 11 on the image 10, the black pixels existing in the foreground part 11b are counted according to a manner which will be described later.

Specifically, the measurement part 22 counts the black pixels existing in each area of the foreground part 11b. Hereinafter, C(n) denotes the thus-counted number of black pixels on the n-th area, where n=1 through 9, and also, C(a) and C(b) denote the numbers of black pixels in the respective area 'a' and area 'b'.

(1) For the purpose of determining whether or not the foreground part 11b is sufficiently black, the total number of black pixels Cs is calculated by the following formula (1):

$$Cs = \Sigma C(i) \quad (1)$$

where i=1 through 9.

(2) For the propose of determining whether or not the background part 11c is sufficiently white, the Cx is calculated by the following formula (2):

$$Cx = C(a) + C(b) \quad (2)$$

However, this calculation by the formula (2) is not made when the above-mentioned value Cs is sufficiently large, i.e., the foreground part 11b is sufficiently black.

In case the above-mentioned value Cs is sufficiently large, i.e., the foreground part 11b is sufficiently black, Cx is calculated rather by the following formula (3):

$$Cx = (C(b) - 2) \times 2 \quad (3)$$

In case where the entire binary image 10 is black, each mark (black circle) may have been crushed, so that the mark becomes larger. Thereby, it may be difficult to distinguish the case from a case a shape other than a circle has a black background. In order to solve this problem, only in case the foreground part 11b is sufficiently black, the black pixels rather in the If area 'b' which is not adjacent to the foreground part 11b are counted as in the formula (3) assuming that the crush of the mark occurs so that the mark may have been somewhat enlarged. Thereby, even in such a case, the mark can be left as a candidate for the subsequent stage. It is noted that, "−2" in the above-mentioned formula (3) is only for numerical adjustment.

(3) In order to determine symmetry of the target mark, Csym is calculated which is the number of black pixels obtained by performing exclusive OR (XOR) operation-between pixels located left-and-right symmetrical positions with respect to the vertical center line on the mask 11 for the areas 1 through 9. That is, when both the symmetrical pixels are black or white, the result of XOR is white, while, when only one thereof is white, the result is black. In other words, the XOR result becomes black only when the values of both the symmetrical pixels are different. Accordingly, Csym becomes larger as the target mark becomes more different from a left-and-right symmetrical shape.

Figures 5, 6:
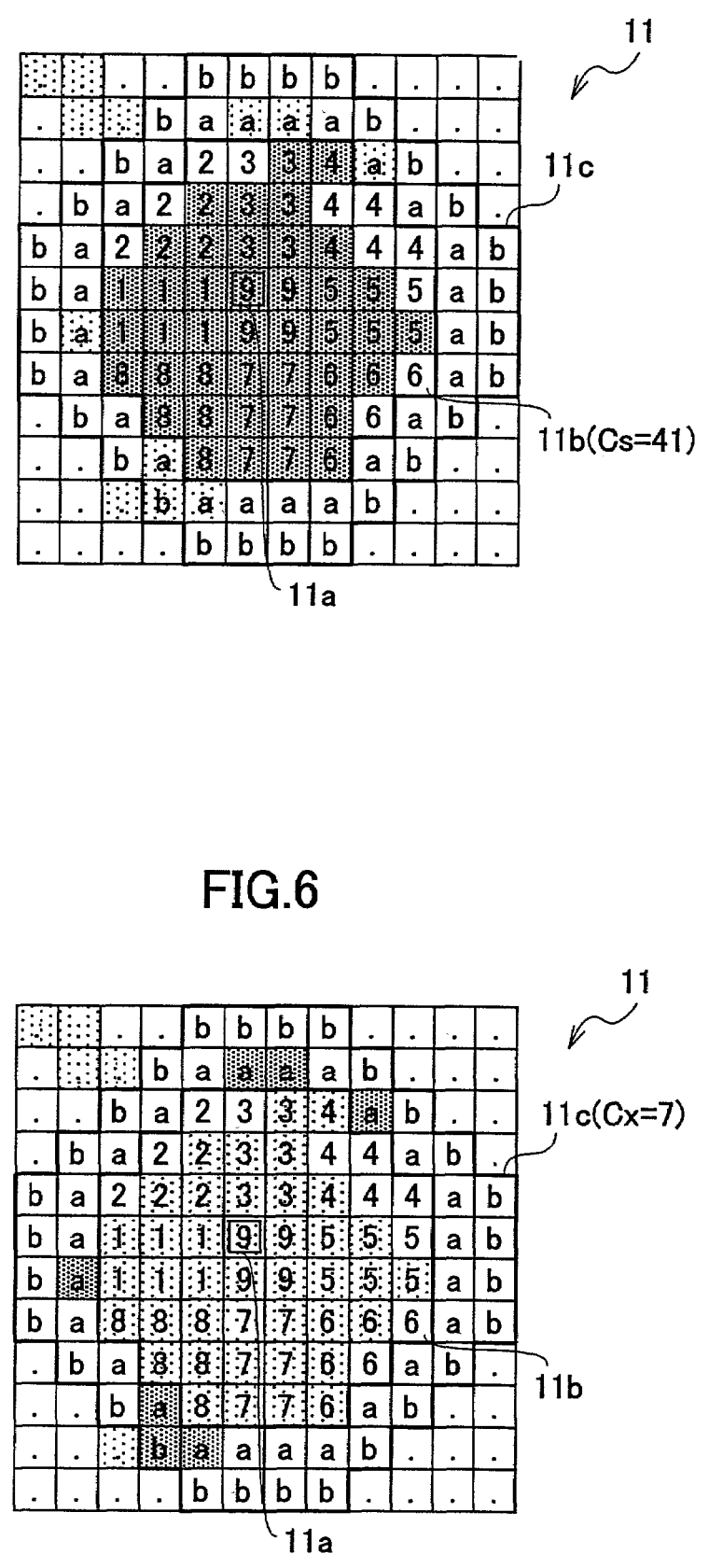
Figure 7:
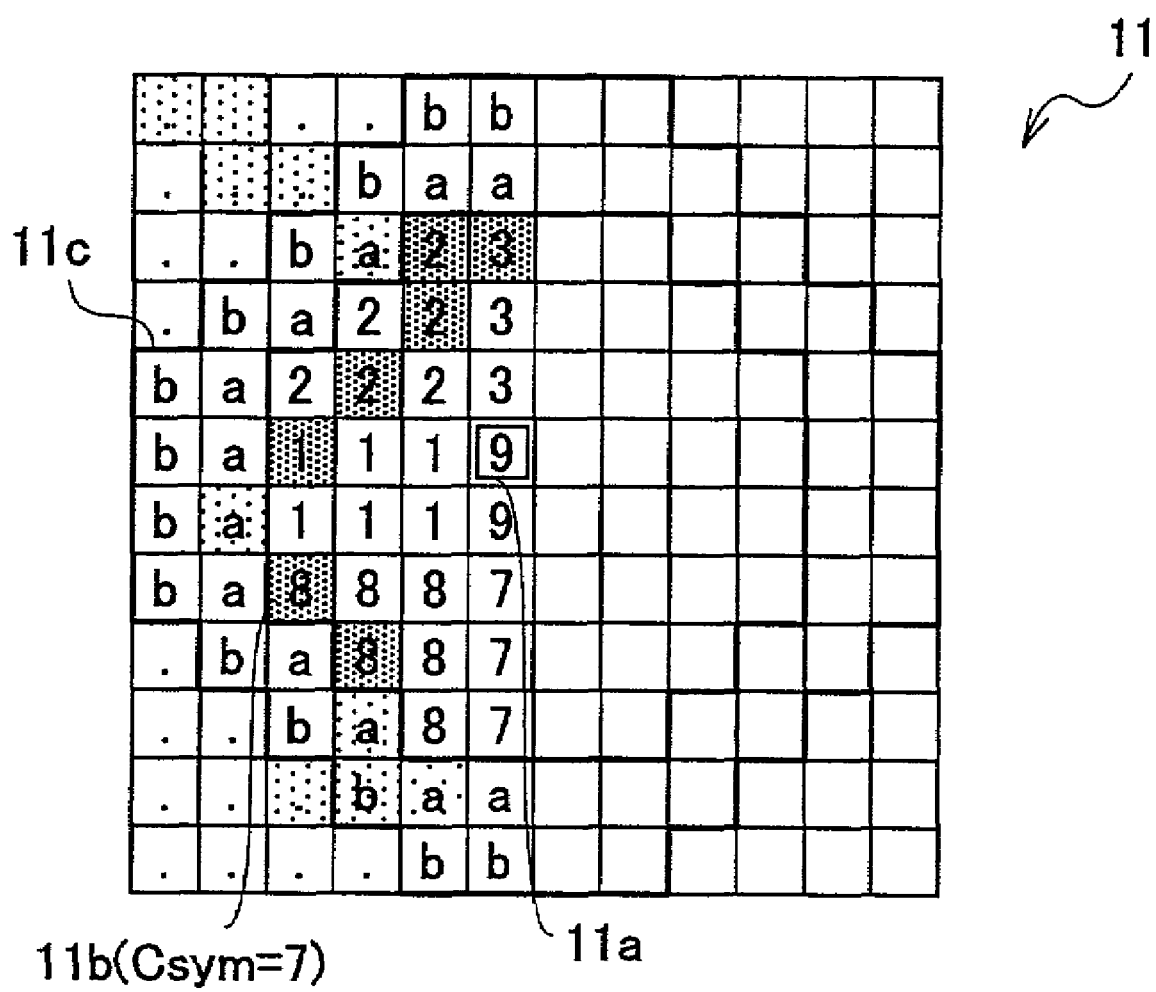
FIG. 7 shows another example of an arrangement of black pixels to be counted after performance of logical operation between the pixels on the mask shown in FIG. 4 according to the present invention.

FIG. 4 shows an example of arrangement of black pixels on the mask 11 shown in FIG. 3, and halftone portions (portions in deep gray) represent black pixels, respectively, in the figure. According to the example of arrangement of the black pixels shown in FIG. 4, the respective numbers Cs and Cx of black pixels and Csym are obtained by counting. FIGS. 5, 6, and 7 show examples of arrangement of black pixels to be counted.

As shown in FIG. 5, when the black pixels in the areas 1 through 9 on the foreground part 11b (portions in deeper gray) are counted, Cs=41. As shown in FIG. 6, when the black pixels in the areas 'a' and 'b' on the background part 11c (portions in deeper gray) are counted, Cx=7. Similarly, as shown in FIG. 7, when the exclusive OR operation is performed between each pair of left-and-right symmetrical pixels with respect to the vertical center line on the foreground part 11b, and then, the black pixels obtained by the operation (portions in deeper gray) are counted, Csym=7.

Then, in the above-mentioned first scoring part 23, the counting part 23a converts the thus-obtained numbers Cs, Cx and Csym into various scores which express characters of the target mark examined, as follows:

(1) The following two-dimensional table 1, for example, is used for converting the relationship in the number of black pixels between Cs and Cx into a score Psx which expresses how the target mark is resemble with the predetermined circle.

TABLE 1

(for Psx)

| Cx | ...11 | 12...9 | 20...27 | 28...35 | 36... |
|---|---|---|---|---|---|
| | | | Cs | | |
| 0...7 | −1 | 22 | 27 | 29 | 30 |
| 8...15 | −1 | 8 | 25 | 28 | 29 |
| 16...23 | −1 | −1 | 8 | 23 | 24 |
| 24... | −1 | −1 | −1 | 12 | 25 |

Specifically, according to table 1, as Cs is larger and Cx is smaller, the score becomes higher.

(2) The following two-dimensional table 2, for example, is used for converting the relationship between the numbers of black pixels C(1) through C(9) in the respective first through ninth areas, based on such a relationship as that, as lacks (i.e., white) in the foreground part 11b are fewer, the target mark more resembles the predetermined circle, where Pc expresses the score indicating the continuity of the foreground part 11b.

TABLE 2

(for Pc)

| C(1) through C(9) in number | Score Pc |
|---|---|
| Every one is not less than 4 | 7 |
| Only one is less than 4 | 3 |
| Each of only one pair of adjacent ones is less than 4 | 2 |
| The other cases | −1 |

Specifically, according to table 2, as the number in every area is larger, the score becomes higher.

(3) The score Psym represents symmetry, and, based on such a supposition that, as the symmetry in the foreground 11b is higher, the target mark more resembles the predetermined circle, the score Psym is obtained from the following two-dimensional table 3 as the relationship between the above-mentioned number Csym of black pixels and the number Cs of black pixels.

TABLE 3

(for Psym)

| | Cs | | | |
|---|---|---|---|---|
| Csym | 0...7 | 8...15 | 16...23 | 24... |
| 0...3 | −1 | −1 | −1 | −1 |
| 4...7 | −1 | 2 | 1 | −1 |
| 8...11 | −1 | 1 | 2 | 1 |
| 12... | −1 | −1 | 2 | 3 |

(4) The rotatioality is represented by Pac, and, by using the following two-dimensional tables 4, (A) and (B), supposing that, as the periodicity in the circumferential direction is smaller in the target mark, the target mark more resembles the predetermined circle, differences between the numbers C(1) through C(9) of black pixels in the respective first through ninth areas are converted into the score Pac. This determination is made in order to prevent halftone dots from being erroneously determined as the predetermined circle. For example, for examining the periodicity in 45 degrees and the periodicity in 90 degrees, the following formulas (4) and (5) are used. The formula (4) calculates differences in numbers of black pixels between areas having positional relationship of 45 degrees, and then, sums them. The thus-obtained sum is referred to as Ca45. Similarly, the formula (5) calculates differences in numbers of black pixels between areas having positional relationship of 90 degrees, and then, sums them. The thus-obtained sum is referred to as Ca90.

$$Ca45=|C(1)-C(2)|+|C(2)-C(3)|+|C(3)-C(4)|+|C(4)-C(5)|+|C(5)-C(6)|+|C(6)-C(7)|+|C(7)-C(8)|+|C(8)-C(1)| \quad (4)$$

$$Ca90=|C(1)-C(3)|+|C(2)-C(4)|+|C(3)-C(5)|+|C(4)-C(6)|+|C(5)-C(7)|+|C(6)-C(8)|+|C(7)-C(1)|+|C(8)-C(2)| \quad (5)$$

If the target mark is of an ideal circle, the number of black pixels of each area is equal to every others, and, thus, C(n)=C(m) where n and m are every ones of 1 through 8. As a result, Ca45=Ca90=0. However, Ca45>>0 and Ca90=0 when the target mark comprises halftone dots present in vertical and horizontal directions.

With regard to the following table 4 also mentioned above, it is noted that, the score in each place indicated by (B) in table (A) is obtained by using table (B).

TABLE 4

(for Pac)

| | Ca90 | | | |
|---|---|---|---|---|
| Ca45 | 0...3 | 4...7 | 8...11 | 12... |
| | (A) | | | |
| 0...3 | (B) | (B) | (B) | (B) |
| 4...7 | −1 | (B) | (B) | (B) |

TABLE 4-continued (for Pac)

| | | | | |
|---|---|---|---|---|
| 8 ... 11 | −1 | −1 | (B) | (B) |
| 12 ... | −1 | −1 | −1 | (B) |

Cs

| Ca45 | ... 11 | 12 ... 19 | 20 ... 27 | 28 ... 35 | 36 ... |
|---|---|---|---|---|---|

(B)

| | | | | | |
|---|---|---|---|---|---|
| 0 ... 3 | 5 | 5 | 5 | 5 | 5 |
| 4 ... 7 | 5 | 5 | 5 | 5 | 4 |
| 8 ... 11 | 5 | 5 | 5 | 4 | 3 |
| 12 ... 15 | 5 | 5 | 5 | 2 | 1 |
| 16 ... | 5 | 5 | 3 | −1 | −1 |

The first scoring part 23 has the score summarizing part 23b, which calculates a final mark resemblance Pel from the various scores obtained by the counting part 23a as described above. The following formula (6) and formula (7), for example, are used for calculating the final resemblance Pel.

Pel=0, when at least one of Psx, Pc, Psym, and Pac, mentioned above, is −1     (6)

Pel=Psx+Pc+Psym+Pac, in any other cases     (7)

However, the calculation formula is not limited thereto, and, subtraction type one may be used, instead, such as Pel=Psx−Pc−Psym−Pac, depending on scoring manners employed by the counting part 23a. The thus-calculated Pel is sent to the registration part 31.

The registration part 31 sends, to the detection part 32, only the target marks each having the mark resemblance Pel not less than a predetermined value. However, when the distances between the target marks are not longer than a predetermined number of pixels, only the target mark having the highest score thereof is sent to the detection part 32. This is because a plurality of marks present within the predetermined number of pixels are-to be prevented from being extracted. Further, what is more important is, it is necessary to determine more accurate mark position by selecting the mark having the highest score (highest reliability).

Figure 8:
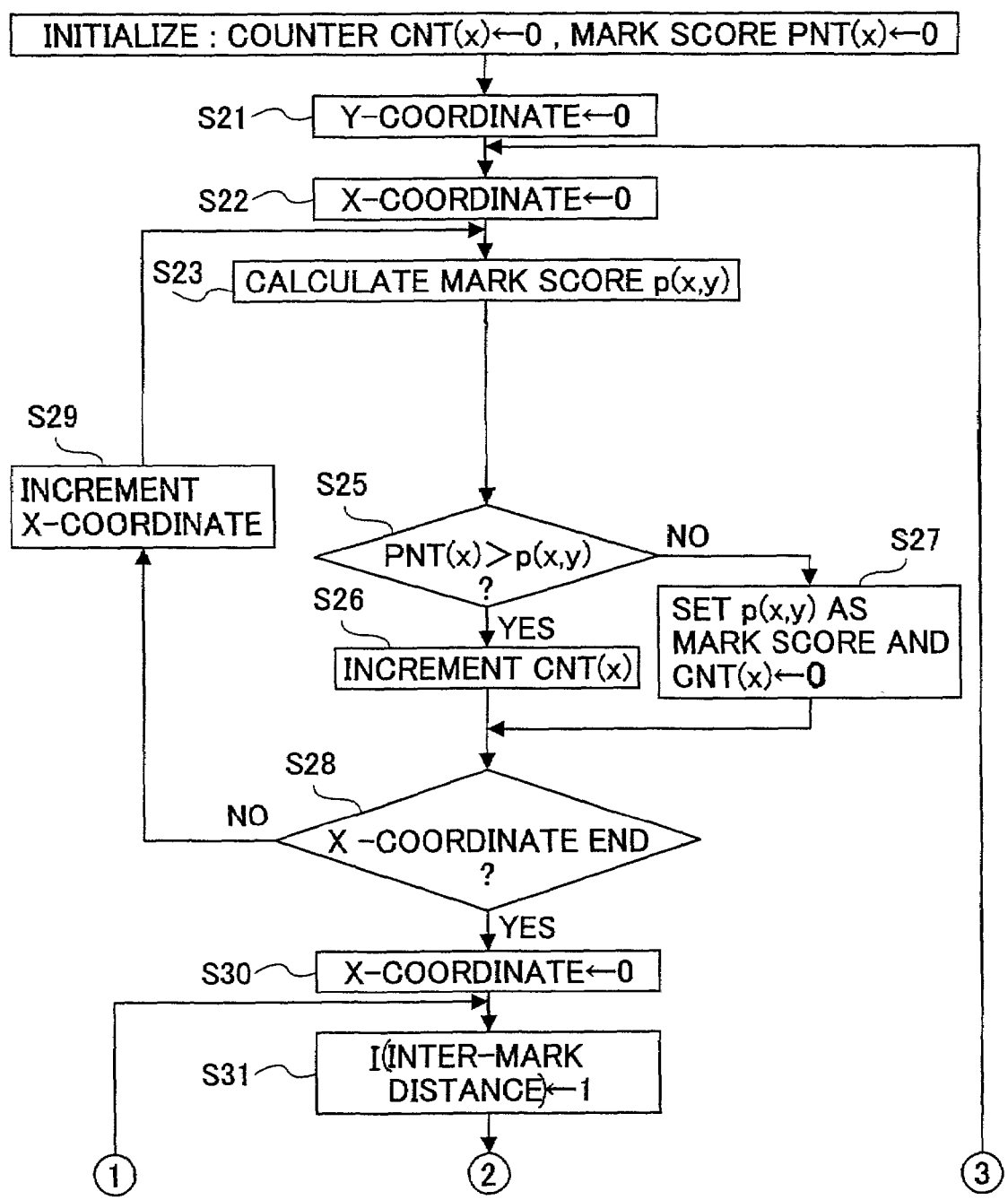
FIGS. 8 and 9 show an operation flow chart illustrating an example of processing performed by a registration part shown in FIG. 1 according to the present invention.
Figure 9:
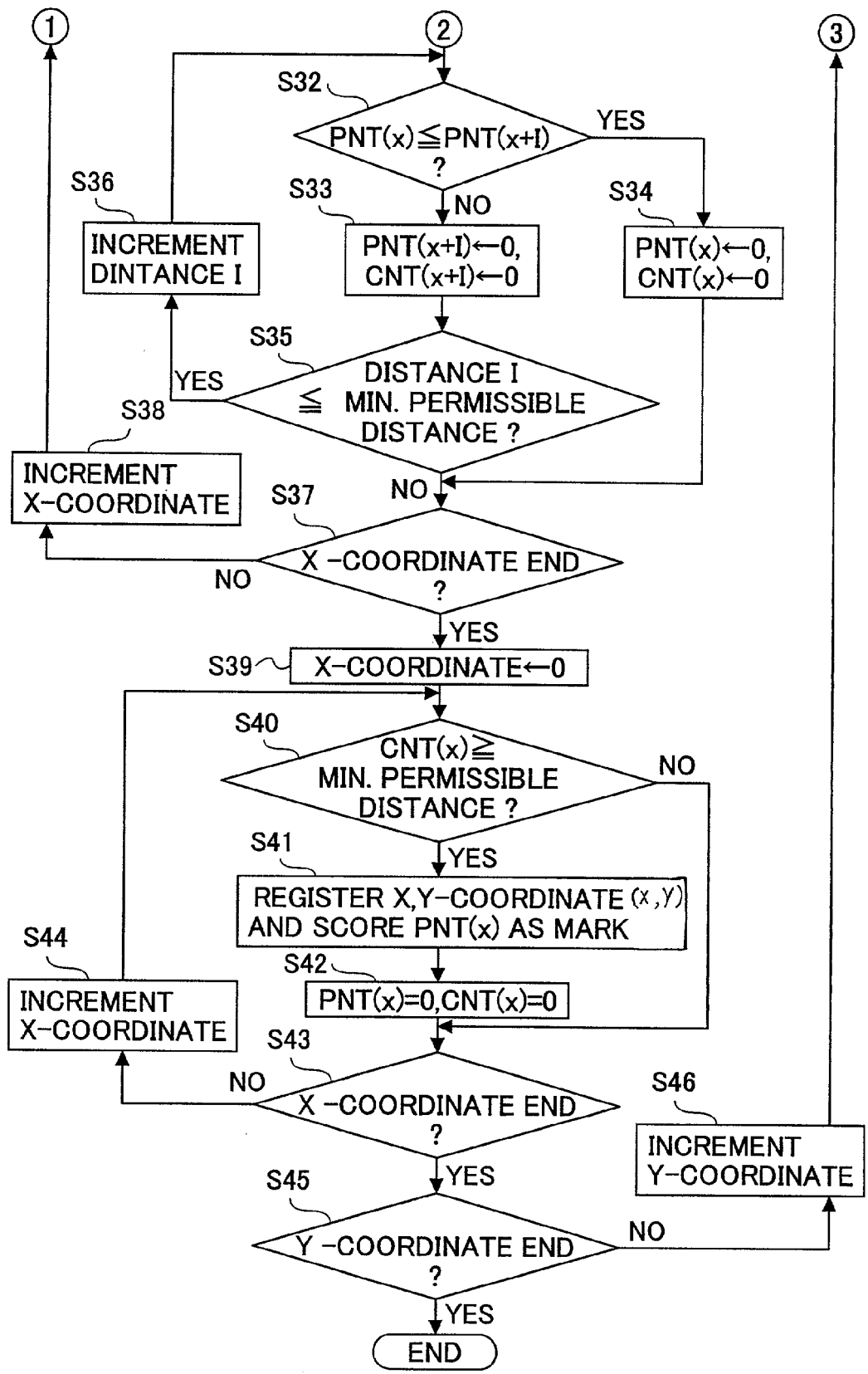

FIGS. 8 and 9 show an operation flow chart illustrating an example of processing performed by the registration part 31 according to the present invention.

First, a counter counting the number of pixels CNT(x) and a score buffer storing the mark score PNT(x) are prepared. All the initial values are 0. First, the x-coordinate and y-coordinate are set to 0 (in steps S21 and S22). A temporarily extracted mark is given a score, which is then represented by p(x,y) in a step S23, and, then, p(x,y) is compared with the mark score PNT(x) previously stored in the score buffer (in a step S25). Then, one of them having the larger score is stored in the score buffer. That is, when p(x,y) is smaller than PNT(x), PNT(x) is left in the score buffer as it is, and CNT(x) is incremented by one in a step S26. When p(x,y) is not smaller than PNT(x), p(x,y) is stored in the score buffer as the mark score, and CNT(x) is initialized into 0 in a step S27. Then, it is determined whether or not the current x value is the last value in x-coordinate, in a step S28. When the current x value is not the last value in x-coordinate, the x value is incremented by one in a step S29, and the operation is returned into the step S23. When the current x value is the last value in x-coordinate, the x value is initialized into 0 in a step S30, and the operation is continued into a step S31.

Then, an inter-mark distance I is set into 1 in a step S31. Then, the score buffers are scanned, and, the mark scores of the marks present less than a predetermined minimum permissible distance from one another are compared. That is, the mark scores PNT(x) and PNT(x+I) are compared by one another in a step S32. Then, when PNT(x) is larger than PNT(x+I), PNT(x) is left as it is, while PNT(x+I) is set into 0 in a step S33. Then, the inter-mark distance I is compared with the predetermined minimum permissible distance in a step S35. Then, when the distance I is not larger than the permissible value, the distance I is incremented by one in a step S36. When the distance I is larger than the permissible value, the operation is continued to a step S37. When PNT(x) is not larger than PNT(x+I) in the step S32, PNT (x+I) is left as it is, while PNT(x) is set into 0 in a step S34, and then, the operation is continued into the step S37.

In the step S37, it is determined whether or not the current x value is the last value in x-coordinate. When it is not the last in x-coordinate, the x value is incremented, and, then, the operation is returned into the step S31. When it is the end in x-coordinate in the step S37, the x value is initialized into 0, and the operation is continued into a step S40, in a step S39.

Then, the above-mentioned counters are scanned, and, it is determined whether each counter value CNT(x) is not less than a predetermined minimum permissible distance in a step S40. When CNT(x) is not less than the minimum permissible distance, the relevant coordinate values and score are registered as a mark candidate to be sent to the detection part 32 in a step S41. When CNT(x) is less than the minimum permissible distance, the operation is continued into a step S43. After the coordinate values and score are sent to the detection part in the step S41, each of PNT(x) and CNT(x) is initialized into 0 in a step S42, and, then, it is determined whether the current x value is the last in x-coordinate in a step S43. When it is not the last in x-coordinate, the x value is incremented by one in a step S44, and the operation is returned into the step S40. When it is the last in x-coordinate, it is determined whether or not the current y value is the last in y-coordinate in a step S45. When it is not the last in y-coordinate, the y value is incremented by one in a step S46, and the operation is returned into the step S22. When it is the last in y-coordinate, the operation is finished.

A specific example of operation of the registration part described above with reference to FIGS. 8 and 9 will now be described.

First, the above-mentioned minimum permissible distance in the step S34 is "3" while the same in the step S40 is also "3".

It is assumed that the score p(x,y) is as follows, for example:

| X = | 1 | 2 | 3 | 4 | 5 | 6 | 7 | 8 |
|---|---|---|---|---|---|---|---|---|
| Y = 1 | ...0 | 0 | 0 | 0 | 0 | 0 | 0 | 0... |
| Y = 2 | ...0 | 0 | 0 | 0 | 15 | 0 | 0 | 0... |
| Y = 3 | ...0 | 0 | 0 | 18 | 20 | 0 | 0 | 0... |
| Y = 4 | ...0 | 0 | 0 | 0 | 12 | 0 | 0 | 0... |
| Y = 5 | ...0 | 0 | 0 | 0 | 0 | 0 | 0 | 0... |
| Y = 6 | ...0 | 0 | 0 | 0 | 0 | 0 | 0 | 0... |
| Y = 7 | ...0 | 0 | 0 | 0 | 0 | 0 | 0 | 0... |

Then, until Y=2, X=4 from the initial state:

| X = | 1 | 2 | 3 | 4 | 5 | 6 | 7 | 8 |
|---|---|---|---|---|---|---|---|---|
| PNT (X) = | 0 | 0 | 0 | 0 | 0 | 0 | 0 | 0 |
| CNT (X) = | 0 | 0 | 0 | 0 | 0 | 0 | 0 | 0 |

Then, when Y=2, X=5, (S25) becomes No since PNT(5) (=0)<p(5,2)(=15), then PNT(5)←p(5,2), CNT(5)←0(S27), thus,

| X = | 1 | 2 | 3 | 4 | 5 | 6 | 7 | 8 |
|---|---|---|---|---|---|---|---|---|
| PNT (X) = | 0 | 0 | 0 | 0 | 15 | 0 | 0 | 0 |
| CNT (X) = | 0 | 0 | 0 | 0 | 0 | 0 | 0 | 0 |

(S32) becomes No as PNT(5)(=15)>PNT(5+I)(=0) when X=5, then PNT(5+I)←0, CNT(5+I)←0(S33), while (S32) becomes Yes as PNT(X)(=0)=PNT(X+I)(=0) when X≠5 then PNT(X)←0, CNT(X)←0 (in any case, PNT, CNT do not change). Then, (S40) becomes No, as CNT(X)(=0)<3 (PNT, CNT do not change).

Then, when Y=3, X=4 (S25) becomes No as PNT(4)(=0)<p(4,3)(=18), then PNT(4)←p(4,3), CNT(4)←0 (S27), and, thereby,

| X = | 1 | 2 | 3 | 4 | 5 | 6 | 7 | 8 |
|---|---|---|---|---|---|---|---|---|
| PNT (X) = | 0 | 0 | 0 | 18 | 15 | 0 | 0 | 0 |
| CNT (X) = | 0 | 0 | 0 | 0 | 0 | 0 | 0 | 0 |

Then, when Y=3, X=5, (S25) becomes No as PNT(5) (=15)<p(5,3)(=20), then PNT(5)←p(5,3), CNT(5)←0 (S27), and, thereby,

| X = | 1 | 2 | 3 | 4 | 5 | 6 | 7 | 8 |
|---|---|---|---|---|---|---|---|---|
| PNT (X) = | 0 | 0 | 0 | 18 | 20 | 0 | 0 | 0 |
| CNT (X) = | 0 | 0 | 0 | 0 | 0 | 0 | 0 | 0 |

(S32) becomes Yes as PNT(X)(=0)=PNT(X+I)(=0) when X<4, and, thereby, PNT(X)←0, CNT(X)←0 (S34) (PNT, CNT do not change), while, (S32) becomes Yes as PNT(4) (=18)<PNT(5)(=20) when X=4 and I=1, and, thereby, PNT (4)←0, CNT(4)←0 (S34), and, thereby

| X = | 1 | 2 | 3 | 4 | 5 | 6 | 7 | 8 |
|---|---|---|---|---|---|---|---|---|
| PNT (X) = | 0 | 0 | 0 | 0 | 20 | 0 | 0 | 0 |
| CNT (X) = | 0 | 0 | 0 | 0 | 0 | 0 | 0 | 0 |

(S32) becomes No as PNT(5)(=20)>PNT(5+I)(=0) when X=5, and, thereby, PNT(5+I)←0, CNT(5+I)←0 (S33) (PNT, CNT do not change), while, (S32) becomes Yes as PNT(X) (=0)=PNT(X+I)(=0) when X>5, and, thereby, PNT(X)←0, CNT(X)←0 (S34) (PNT, CNT do not change).

(S40) becomes No as CNT(X)(=0)<3 (PNT, CNT do not change).

Then, when Y=4, X=5, (S25) is Yes as PNT(5)(=20)>p (5,4)(=12), then, CNT(5)←CNT(5)+1 (S26), and, thereby,

| X = | 1 | 2 | 3 | 4 | 5 | 6 | 7 | 8 |
|---|---|---|---|---|---|---|---|---|
| PNT (X) = | 0 | 0 | 0 | 0 | 20 | 0 | 0 | 0 |
| CNT (X) = | 0 | 0 | 0 | 0 | 1 | 0 | 0 | 0 |

(S32) becomes Yes as PNT(X)(=0)=PNT(X+I)(=0) when X<5, then PNT(X)←0, CNT(X)←0 (S34), while (S32) becomes No as PNT(5)(=20)>PNT(5+I)(=0) when X=5, then PNT(5+I)←0, CNT(5+I)←0 (S33).

(S32) becomes Yes as PNT(X)(=0)=PNT(X+I)(=0) when X>5, then PNT(X)←0, CNT(X)←0 (S34).

(Any case, PNT, CNT do not change.)

(S40) becomes No as CNT(X)(=0)<3 (PNT, CNT do not change).

Then, when Y=5, X=5, (S25) is Yes as PNT(5)(=20)>p (5,5)(=0), and, thereby, CNT(5)←CNT(5)+1 (S26), and, thus

| X = | 1 | 2 | 3 | 4 | 5 | 6 | 7 | 8 |
|---|---|---|---|---|---|---|---|---|
| PNT (X) = | 0 | 0 | 0 | 0 | 20 | 0 | 0 | 0 |
| CNT (X) = | 0 | 0 | 0 | 0 | 2 | 0 | 0 | 0 |

(S32) becomes Yes as PNT(X)(=0)=PNT(X+I)(=0) when X<5, then PNT(X)←0, CNT(X)←0 (S34), while (S32) becomes No as PNT(5)(=20)>PNT(5+I)(=0) when X=5, then PNT(5+I)←0, CNT(5+I)←0 (S33).

(S32) becomes Yes as PNT(X)(=0)=PNT(X+I)(=0) when X>5, then PNT(X)←0, CNT(X)←0 (S34).

(Any case, PNT, CNT do not change.)

(S40) becomes No as CNT(X)(=0)<3 (PNT, CNT do not change).

Then, when Y=6, X=5, (S25) is Yes as PNT(5)(=20)>p (5,6)(=0), and, thereby, CNT(5)←CNT(5)+1 (S26), and, thus

| X = | 1 | 2 | 3 | 4 | 5 | 6 | 7 | 8 |
|---|---|---|---|---|---|---|---|---|
| PNT (X) = | 0 | 0 | 0 | 0 | 20 | 0 | 0 | 0 |
| CNT (X) = | 0 | 0 | 0 | 0 | 3 | 0 | 0 | 0 |

(S32) becomes Yes as PNT(X) (=0)=PNT(X+I) (=0) when X<5, then PNT(X)←0, CNT(X)←0 (S34), while (S32) becomes No as PNT(5) (=20)>PNT(5+I) (=0) when X=5, then PNT(5+I)←0, CNT(5+I)←0 (S33)

(S32) becomes Yes as PNT(X)(=0)=PNT(X+I)(=0) when X>5, then PNT(X)←0, CNT(X)←0 (S34).

(Any case, PNT, CNT do not change.)

(S40) becomes No as CNT(X)(=0)<3 when X<5 (PNT, CNT do not change).

(S40) becomes Yes as CNT(5)(=3)=3 when X=5, then registration (S41), then (S42)

| X =     | 1 | 2 | 3 | 4 | 5 | 6 | 7 | 8 |
|---------|---|---|---|---|---|---|---|---|
| PNT (X) = | 0 | 0 | 0 | 0 | 0 | 0 | 0 | 0 |
| CNT (X) = | 0 | 0 | 0 | 0 | 0 | 0 | 0 | 0 |

(S40) becomes No as CNT(X)(=0)<3, when X>5 (PNT, CNT do not change).

Then, the processing is continued.

When the target marks have an ideal arrangement, the distances between the marks have theoretical values. However, actually, they may be somewhat different from the theoretical values even when the marks are actually the predetermined ones to be recognized/detected. The detection part 32 gives a score on the differences from the theoretical values, and sends them to the second scoring part 33. In this case, the score becomes higher as the differences from the theoretical values becomes smaller. For example, a pattern of a regular triangle having three marks as vertexes thereof, and each distance therebetween is 30 pixels as a length on a respective side thereof is assumed. Distances d1, d2 and d3 between respective marks actually arranged are calculated, and difference from the ideal distance of 30 pixels is obtained for each side. Then, the thus-obtained distances are summed as D, as shown in the following formula (8):

$$D=|d1-30|+|d2-30|+|d3-30| \quad (8)$$

Then, based on the thus-obtained D, a score Pd is obtained by using the following two-dimensional table 5:

TABLE 5

| | (for Pd) | | | |
|---|---|---|---|---|
| D | 0...2 | 3...5 | 6...8 | 9... |
| Pd | 10 | 8 | 5 | −1 |

The second scoring part 33 sums the mark resemblance Pel obtained by the score summarizing part 23b and the score Pd obtained by the detection part 32 so as to obtain a score Psc representing a final pattern resemblance. The following formula (9) is one example of calculating the final pattern resemblance Psc:

$$Psc=\Sigma Pel+Pd \quad (9)$$

Where "Σ" means summing Pel for all the marks constitute the pattern.

The decision part 34 determines that the target marks are of the pattern to be recognized/detected when the above-mentioned final pattern resemblance Psc is higher than a predetermined threshold.

Further, the present invention is not limited to the above-described embodiments, and variations and modifications may be made without departing from the scope of the present invention.

The present application is based on Japanese priority application No. 2001-017035, filed on Jan. 25, 2001, the entire contents of which are hereby incorporated by reference.

What is claimed is:

1. An image recognition system comprising:

an examining part which examines as to how much input image parts resemble a predetermined figure comprising a plurality of elements, said plurality of elements each having the same shape, and gives a first score on each image part as to how much it resembles the element of the predetermined figure, and gives a second score on the image parts as to how much a positional relationship therebetween resembles that of the elements of the predetermined figure; and a determining part which determines as to whether or not the input image parts coincide with the predetermined figure by using the first respective scores and the second score synthetically, wherein said examining part comprises a measurement part which measures the number of pixels each having a gray-scale level higher than a predetermined threshold on a foreground part, and measures the same on a background part of each image part, and a first scoring part which gives a score as to relationship between the thus-measured numbers of pixels, and wherein said measurement part does not measure the number of pixels on the background part near the boundary with the foreground part when the measured number of pixels on the foreground part is larger than a predetermined value.

2. An image recognition system comprising:

an examining part which examines as to how much input image parts resemble a predetermined figure comprising a plurality of elements, said plurality of elements each having the same shape, and gives a first score on each image part as to how much it resembles the element of the predetermined figure, and gives a second score on the image parts as to how much a positional relationship therebetween resembles that of the elements of the predetermined figure; and a determining part which determines as to whether or not the input image parts coincide with the predetermined figure by using the first respective scores and the second score synthetically, wherein said examining part obtains continuity of a foreground part from the number of pixels each having a gray-scale level higher than a predetermined threshold in respective areas obtained from dividing the foreground part.

3. An image recognition system comprising:

an examining part which examines as to how much input image parts resemble a predetermined figure comprising a plurality of elements, said plurality of elements each having the same shape, and gives a first score on each image part as to how much it resembles the element of the predetermined figure, and gives a second score on the image parts as to how much a positional relationship therebetween resembles that of the elements of the predetermined figure; and a determining part which determines as to whether or not the input image parts coincide with the predetermined figure by using the first respective scores and the second score synthetically, wherein said examining part examines angular periodicity on each image part.

4. An image recognition system comprising:

an examining part which examines as to how much input image parts resemble a predetermined figure comprising a plurality of elements, said plurality of elements each having the same shape, and gives a first score on each image part as to how much it resembles the element of the predetermined figure, and gives a second score on the image parts as to how much a positional relationship therebetween resembles that of the elements of the predetermined figure; and a determining part which determines as to whether or not the input image parts coincide with the predetermined figure by using the first respective scores and the second score synthetically, wherein said examining part gives a plurality of primary scores on each image part with respect to various characteristic factors, and then, gives a final score thereon by combining the plurality of primary scores according to a predetermined manner.

5. An image recognition system comprising:

an examining part which examines as to how much input image parts resemble a predetermined figure comprising a plurality of elements, said plurality of elements each having the same shape, and gives a first score on each image part as to how much it resembles the element of the predetermined figure, and gives a second score on the image parts as to how much a positional relationship therebetween resembles that of the elements of the predetermined figure; and a determining part which determines as to whether or not the input image parts coincide with the predetermined figure by using the first respective scores and the second score synthetically, further comprising a selecting part which selects one of a plurality of image parts to be sent to the determining part when the plurality of image parts are present less than a predetermined distance from each other.

6. An image recognition system comprising:

an examining part which examines as to how much input image parts resemble a predetermined figure comprising a plurality of elements, said plurality of elements each having the same shape, and gives a first score on each image part as to how much it resembles the element of the predetermined figure, and gives a second score on the image parts as to how much a positional relationship therebetween resembles that of the elements of the predetermined figure; and a determining part which determines as to whether or not the input image parts coincide with the predetermined figure by using the first respective scores and the second score synthetically, wherein said determining part sums the total score on the respective input image parts and a score as to how much the arrangement of the respective image parts resembles that of the respective elements of the predetermined figure.

7. An image recognition method comprising the steps of:

a) examining as to how much input image parts resemble a predetermined figure comprising a plurality of elements, said plurality of elements each having the same shape, and giving a first score on each image part as to how much it resembles the element of the predetermined figure, respectively, and giving a second score on the image parts as to much a positional relationship therebetween resembles that of the respective elements of the predetermined figure; and b) determining as to whether or not the input image parts coincide the predetermined figure by using the first and second scores synthetically, wherein said step a) comprises the steps of a1) measuring the number of pixels each having a gray-scale level higher than a predetermined threshold on a foreground part, and measuring the same on a background part of each image part, and a2) giving a score as to relationship between the thus-measured numbers of pixels, and said step a1) does not measure the number of pixels on the background part near the boundary with the foreground part when the measured number of pixels on the foreground part is larger than a predetermined value.

8. An image recognition method comprising the steps of:

a) examining as to how much input image parts resemble a predetermined figure comprising a plurality of elements, said plurality of elements each having the same shape, and giving a first score on each image part as to how much it resembles the element of the predetermined figure, respectively, and giving a second score on the image parts as to much a positional relationship therebetween resembles that of the respective elements of the predetermined figure; and b) determining as to whether or not the input image parts coincide the predetermined figure by using the first and second scores synthetically, wherein said step a) obtains continuity of a foreground part from the number of pixels each having a gray-scale level higher than a predetermined threshold in respective areas obtained from dividing the foreground part.

9. An image recognition method comprising the steps of:

a) examining as to how much input image parts resemble a predetermined figure comprising a plurality of elements, said plurality of elements each having the same shape, and giving a first score on each image part as to how much it resembles the element of the predetermined figure, respectively, and giving a second score on the image parts as to much a positional relationship therebetween resembles that of the respective elements of the predetermined figure; and b) determining as to whether or not the input image parts coincide the predetermined figure by using the first and second scores synthetically, wherein said step a) examines angular periodicity on each image part.

10. An image recognition method comprising the steps of:

a) examining as to how much input image parts resemble a predetermined figure comprising a plurality of elements, said plurality of elements each having the same shape, and giving a first score on each image part as to how much it resembles the element of the predetermined figure, respectively, and giving a second score on the image parts as to much a positional relationship therebetween resembles that of the respective elements of the predetermined figure; and b) determining as to whether or not the input image parts coincide the predetermined figure by using the first and second scores synthetically, wherein said step a) gives a plurality of primary scores on each image part with respect to various factors, and then, gives a final score thereon by combining the plurality of primary scores according to a predetermined manner.

11. An image recognition method comprising the steps of:

a) examining as to how much input image parts resemble a predetermined figure comprising a plurality of elements, said plurality of elements each having the same shape, and giving a first score on each image part as to how much it resembles the element of the predetermined figure, respectively, and giving a second score on the image parts as to much a positional relationship therebetween resembles that of the respective elements of the predetermined figure; and b) determining as to whether or not the input image parts coincide the predetermined figure by using the first and second scores synthetically, further comprising the step c) of selecting one of a plurality of image parts to be processed by said step b), when the plurality of image parts are present less than a predetermined distance from each other.

12. An image recognition method comprising the steps of:
a) examining as to how much input image parts resemble a predetermined figure comprising a plurality of elements, said plurality of elements each having the same shape, and giving a first score on each image part as to how much it resembles the element of the predetermined figure, respectively, and giving a second score on the image parts as to much a positional relationship therebetween resembles that of the respective elements of the predetermined figure; and
b) determining as to whether or not the input image parts coincide the predetermined figure by using the first and second scores synthetically, wherein:
 said step b) sums the total score on the respective input image parts and a score as to how much the arrangement of the respective image parts resembles that of the respective elements of the predetermined figure.

* * * * *